Dec. 4, 1956   P. VIERKÖTTER   2,772,540
COOLING PROCESS AND DEVICE FOR THE PERFORMANCE OF SAME
Filed Jan. 19, 1953   4 Sheets-Sheet 1

INVENTOR:
PAUL VIERKÖTTER

Dec. 4, 1956     P. VIERKÖTTER     2,772,540
COOLING PROCESS AND DEVICE FOR THE PERFORMANCE OF SAME
Filed Jan. 19, 1953     4 Sheets-Sheet 3
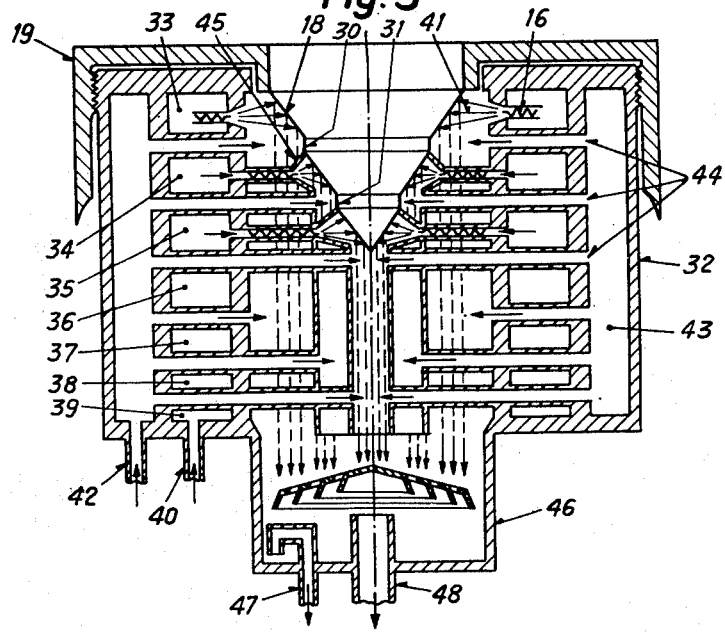
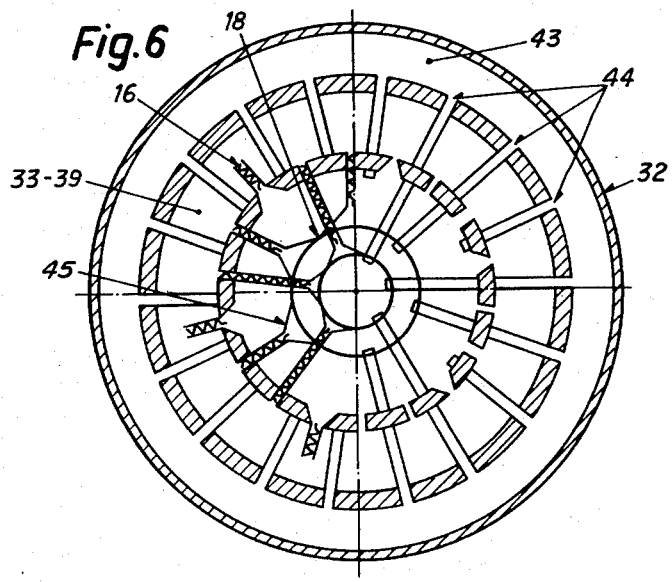
INVENTOR:
PAUL VIERKÖTTER

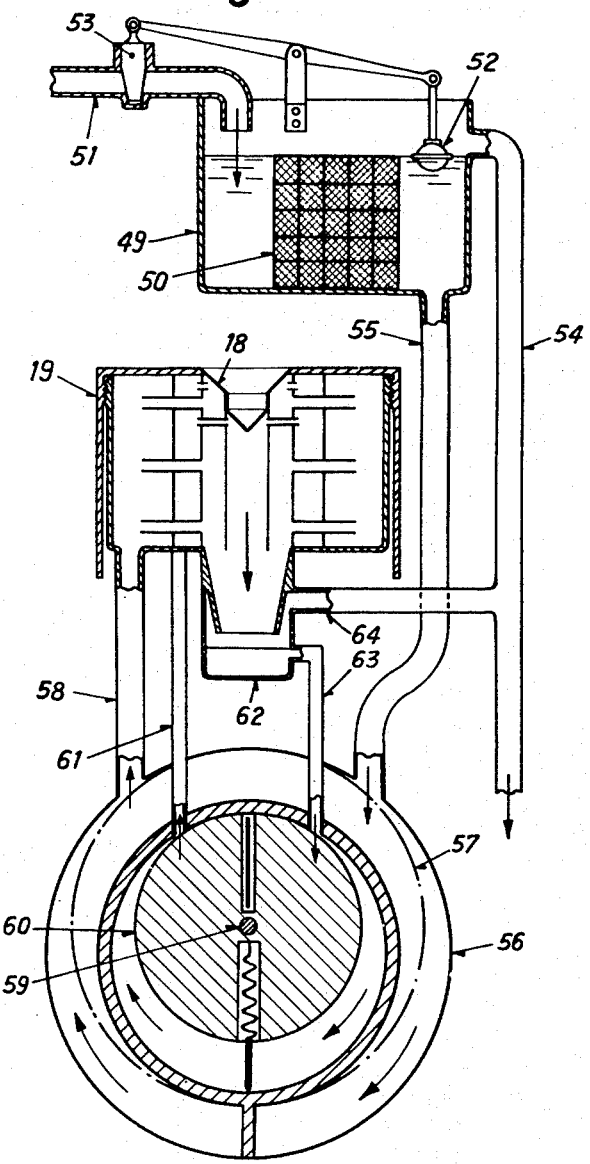

2,772,540

COOLING PROCESS AND DEVICE FOR THE PERFORMANCE OF SAME

Paul Vierkötter, Genoa-Nervi, Italy

Application January 19, 1953, Serial No. 331,860

Claims priority, application Switzerland January 23, 1952

8 Claims. (Cl. 62—1)

The present invention relates to a process for the cooling of bodies for the purpose of continually removing heat therefrom, an intermediate layer being provided between the body to be cooled and the coolant, at least at those parts of the surface of the body on which a stream of coolant impinges. The intermediate layer is of a nature akin to that of the material of the surfaces of the bodies to be cooled and at the same time of at least one component material of the impinging stream of coolant. This component material at the same time belongs to a group of materials possessing good heat conductivity.

In the device for the performance of the cooling process in accordance with the invention the surface of the body to be cooled is covered, at least partially, with an intermediate layer which, avoiding all and any separating layer detrimental to thermal conduction, extends into all pores and irregularities of the surfaces to be cooled and provides good thermal contact between said surfaces and the coolant. To this end the intermediate layer consists of a material which is of a nature akin to the material of the surfaces to be cooled and to at least one component material of the coolant. Devices are provided which conduct the coolant in a continuous stream on to the intermediate layer of the body surfaces to be cooled and there bring in particular that component material of the coolant which is akin to and has an affinity for the material of the intermediate layer into close contact with the said intermediate layer. In this process this component material of the coolant, owning to its being a member of a group of materials having good thermal conductivity, brings about in a special degree the eduction of heat from the surfaces impinged upon.

In the most varied domains of technology the problem arises of cooling bodies which heat up during operation; the bodies here concerned may be constructions with large surface areas, wires, nozzles, etc.

It is a known fact that in numerous devices and pieces of apparatus efficiency depends on the maximum permissible working temperature of certain parts. Examples that readily spring to the mind are the anodes of electron tubes, nozzles, filaments of heat radiators, etc. In all these cases the problem arises of conducting away at the maximum possible speed the large quantities of heat momentarily occurring, so that the material of which the body in question is made will not be overloaded. The cooling methods at present known, however, do not permit of this instantaneous eduction of heat, so that, as has already been indicated, in very many cases it is necessary to work at low efficiencies, i. e., low temperature-loading of the bodies. The reason why the cooling methods at present known fail to achieve the desired end is discernible from the following:

All gaseous or liquid coolants at present known are poor conductors of heat, and it is therefore inevitable that the heat accumulates in the coolants themselves. This accumulation of heat may be further intensified in the case of liquid coolants if, after absorbing thermal energy, they remain for a time, as for example owning to turbulency, in the area to be cooled. The transfer of heat from a surface to be cooled to the coolant is, however, likewise very imperfect. Every solid layer has, however, thoroughly it may have been mechanically worked upon or chemically treated, a rough and uneven surface. These irregularities cause, with the methods of cooling so far known, the persistence of residues of air, and consequently gaps between the surface to be cooled and the coolant. As the surface to be cooled heats up, the air in the interstices expands considerably and at many points prevents any direct and intimate contact of the coolant with the surface to be cooled, thus also preventing complete transfer of the heat to the coolant. Added to this is the fact that a layer of oxide, an inevitable water film, or layers of impurities which, as is commonly known, are not removable even by prolonged heating, themselves form a separatory layer which is an obstacle to heat transfer.

Even in cases where it proves possible to eliminate such undesired separatory layers between the body surfaces to be cooled on the one hand and the coolant on the other and to avoid their occurrence during operation, the efficiency of cooling is unsatisfactory in the customary processes. This is due above all to the generally poor thermal conductivity of the liquid and gaseous coolants so far used.

The cooling process in accordance with the present invention avoids these two shortcomings of the existing methods of cooling bodies by means of liquid or gaseous coolants. On the one hand the body to be cooled is provided, at least at those areas of its surface on which the stream of coolant impinges, with an intermediate intimately bonded layer which promotes the transfer of heat from the surfaces to be cooled, to which end it is made of a material of a nature akin to that of the surfaces to be cooled. The coolant encompassing the cooling of the body likewise has at least one component material of a nature akin to that of the intermediate layer and at the same time possessing good thermal conductivity.

In a preferred embodiment of the process the coolant encompassing the cooling action contains at least one component material of good thermal conductivity whose molecular weight is approximately equal to that of the material of which the intermediate layer is made. Furthermore, in another typical embodiment the component material of good thermal conductivity added to the coolant may be identical to the material of which the intermediate layer is made, so that it is constantly formed and reformed.

The device for the performance of the process is such that a continuous stream of coolant impinges on the body surfaces which are to be cooled and which are provided with an intermediate layer, in particular the component material of good thermal conductivity of the stream of coolant being brought into close contact with the intermediate layer, whereby a particularly effective eduction of heat is achieved.

A typical embodiment of the device for the performance of the process consists of an electron discharge tube or the anode thereof. In the present embodiment the anode consists of gold and a stream of coolant is supplied to it which consists at least in part of mercury. The mercury is fed to that part of the layer of gold which is to be cooled, penetrates the surface of the layer of gold, thereby forming amalgam, and forms a new surface of liquid mercury. There thereby arises an intimate association between the anode material, i. e., the gold plate, and the mercury, which ensures a completely non-accumulative transfer of heat. No such separatory layers as were mentioned earlier arise, and the accumulation of heat by occluded bubbles of air or by surface irregularities is also excluded.

Since mercury has practically the same molecular weight as gold, the transfer of heat can also take place perfectly and completely.

There is also arranged a supply of a supplementary coolant, such for example as water, which in turn extracts from the mercury the heat absorbed by the latter and thus enables the mercury to be immediately re-employed for cooling purposes.

The process in accordance with the present invention, and the device for the performance of the same, are described hereunder with reference to the drawings in which:

Figure 5 is a vertical sectional view of the anode of the X-ray tube of Figure 4 and its surrounding cooling device;

Figure 6 is a horizontal sectional view of the anode and cooling device of Figure 5; and Figure 7 is a schematic representation of a circulating system for the coolant.

Figure 1:
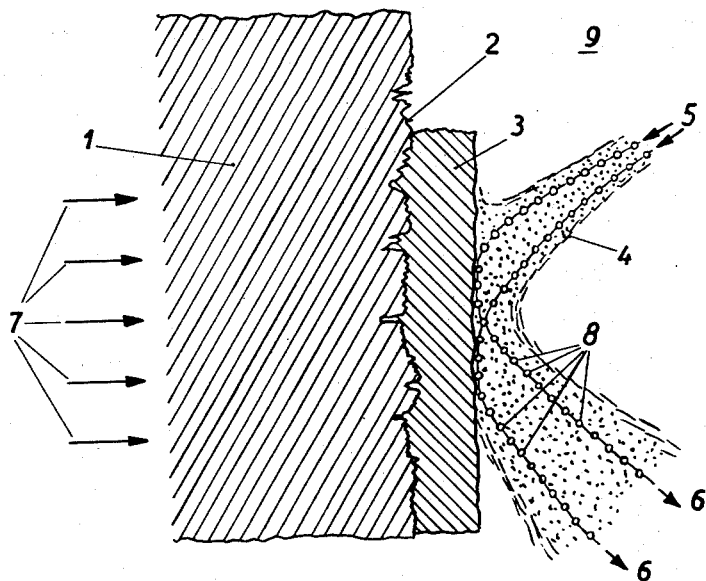
Figure 1 shows a typical embodiment of the principle of the cooling process according to the invention in a schematic and greatly enlarged representation.

A typical representation of the principle of the cooling process in accordance with the present invention is shown schematically and on a greatly enlarged scale in Figure 1. The body surface 1 to be cooled is shown in cross-sectional view, and has a limiting surface 2 having unavoidable irregularities, on which surface an intermediate layer 3 is provided. Directed against the said intermediate layer is a stream of coolant 4 the oblique flow direction of which is indicated by the arrows 5 and 6. If the body surface 1 has a higher temperature than the stream of coolant 4, a temperature gradient will arise in the body 1 the direction of which (i. e. from the higher to the lower temperature) is indicated by the arrows 7. The transport of energy, commonly known also as the "thermal current," likewise takes place in the direction of the arrows 7, i. e. from the hotter body surface 1 to the intermediate layer 3 and the stream of coolant 4.

It is a well-known fact that the surface 1 of a body, i. e., its limiting surface 2, can be completely cleansed of foreign substances only with great difficulty and at considerable technical effort. It is completely impossible, however, to maintain a limiting surface 2 in this cleansed condition for any considerable length of time, especially when the body surface to be cooled is a surface of a piece of apparatus subject to powerful heating in operation. If, however, during the operation of a body surface to be cooled there exists a more or less coherent coating or film of any foreign substances on its limiting surface 2, whether these foreign substances are formed by chemical combination between the material of the body surface 1 and the gaseous or liquid ambient material, or consist of adsorbed gaseous or liquid particles, such a coating or film constitutes a separatory layer for the passage of heat from the body surface 1 to the coolant 4 and causes an undesirable accumulation of heat which is capable of seriously impairing the efficiency of the cooling process. This deleterious effect of such separatory layers rests on the haphazard structure of such coatings, most of which are porous or spongy structures and liable to provide poor thermal conduction, i. e., cause substantial accumulations of heat, even when the thickness of the layer is small.

According to the present invention the occurrence of any undesired separatory films or layers is prevented by applying to the limiting surface 2 of the body surface 1 to be cooled an intermediate layer 3 in such a way that the presence even of only minimal quantities of foreign substances at the limiting surface 2 and within the intermediate layer 3 is avoided with certainty. Such intermediate layers may, according to the nature of the material of the body surface 1 and of the material of the intermediate layer 3, be produced by various known methods, more particularly by vaporization in a vacuum, cathodic atomization, adsorption, absorption, diffusion, by electrolysis and electrochemical processes, by chemical methods, by baking, by surface treatment with melted substances, and by rubbing in.

The material of which the intermediate layer 3 consists must be of a nature akin to that of the material of the surface 1 to be cooled. The term "of a nature akin to" is intended, for the purposes of the present invention, to designate a material which can be applied in the form of a relatively thin intermediate layer to the particular body surface 1 concerned in a given case, which adheres firmly to and has an affinity for the limiting surface 2, possibly forming there a mixed body; which is stable at the operating temperatures of the body surface 1; and which constantly exhibits good heat conductivity, so that the thermal current can pass in the direction of the arrows 7 from the surface 1 of the body into the intermediate layer 3 without any appreciable accumulation of heat at the limiting surface 2.

The extraction of heat from the intermediate layer 3 is effected by a stream of coolant 4 impinging thereupon, this stream of coolant consisting, as indicated schematically in Figure 1 by particles of differing size, either of different component materials or of one homogenous material. The stream of coolant 4 may comprise component materials in the solid, liquid and gaseous state, but must contain at least one component material, indicated by the numeral 8 in Figure 1, that is "of a nature akin to" the material of the intermediate layer 3, has good thermal conductivity, and is able, during the period of contact of its individual particles 8 with the intermediate layer 3, to absorb, and therefore conduct away, as large as possible a quantity of heat from the intermediate layer 3. Owing to the presence of such a component material of good thermal conductivity the cooling action is very substantially enhanced, a fact which is readily apparent since the so-called coefficient of thermal conductivity of water, for example, is superior to that of air approximately by the factor 23, whilst the coefficient of thermal conductivity of silver, in turn, is superior by approximately the factor 700 to that of water. Even a relatively small volumetric proportion of a component material of good thermal conductivity, for instance a metal, in a liquid coolant, for example water, is therefore able very decisively to improve the eduction of heat by the coolant. Such composite coolants can be produced in a large number of variants and, according to their application, used with a varied cooling effect. Some typical embodiments are described below, but a large number of other variants are possible according to the present invention.

A component material of good thermal conductivity can be entrained as a finely-divided substance in the solid state by a liquid and used with the latter as a coolant. It may be a suspension of the solid substance in the liquid, or a more or less pronounced colloidal solution produced by a known method, especially a dispersoid colloid. Such coolants are, for example, suspensions of metallic powder in suitable liquids. Such finely-divided solid substance of good thermal conductivity can also be entrained by a current of gas and used in this form as coolants, in which case, by the use of production methods known in pulverizing technology, the dimensions of the particles can be kept within certain relatively close limits.

In a coolant having at least one component material in the solid state in a stream of liquid or gas as the vehicle, the said component material can be continuously admixed to the vehicle in a constant volumetric ratio. It is also possible, however, not to produce this solid component material in the coolant until immediately before the impingement of the latter on the intermediate layer to be cooled, as for example by arranging for two liquids, two streams of gas, or one liquid and one stream of gas, to mix there and produce the solid substance in a state of fine division as a product of chemical interaction. Such production of the solid component material can also take place in a similar manner by a reaction between more than two components of the coolant.

A component material of good thermal conductivity can also be entrained as a finely-divided substance in the liquid state by a liquid, and be so used as a coolant. The component material of good thermal conductivity forms with the liquid, if the two liquids are not miscible, a suspension or a colloidal mixture.

Such a liquid component material of good thermal conductivity can also be entrained as an aerosol or mist by a current of gas and in this way form a stream of coolant.

In the case of a liquid component material of good thermal conductivity entrained by a stream of liquid or gas, the production of the said component material may also be effected either in such a way that the said component material is continuously present in a constant concentration in the liquid or gaseous coolant, or in such a way that it is not formed until immediately prior to the impingement of the coolant on the intermediate layer to be cooled. In the latter case either two liquids, two streams of gas, or one liquid and one gas, are suitably mixed and the liquid component material produced by their chemical interaction. Needless to say, it is also possible for more than two liquid or gaseous components to participate in the process of formation.

Finally, it is also possible to use vaporous component materials of good thermal conductivity in a liquid or in a stream of gas as coolants, the said vaporous component materials being present either in a constant concentration in the liquid or in the stream of gas, or being formed in the said liquid or gas immediately prior to the impingement of the coolant on the intermediate layer to be cooled. Again, the vaporous component material may be produced by the interaction of a plurality of liquid or gaseous components.

The proportion of the component material of good thermal conductivity in the coolant depends on the quantity of heat to be conducted away, the temperature of the intermediate layer to be cooled and the coolant, the velocity of flow and the quantity of the coolant delivered, and the thermal properties of the various materials participating. There also exists the possibility of regulating manually or automatically the concentration in the coolant of the component material of good thermal conductivity, and moreover of doing so in dependence on the operating conditions, as for example the temperature of the body surface to be cooled, or the quantity of heat educted by the coolant.

In the eduction of heat from the intermediate layer 3 by the stream of coolant 4, or rather, predominantly by the latter's component material of good thermal conductivity, it is important that at the site where the stream of coolant 4 impinges on the intermediate layer 3 a separatory layer composed of foreign substances should not on any account be able to form. To this end the liquid or gaseous components contained, additionally to the component material of good thermal conductivity, in the stream of coolant are so selected that they form a protective layer or protective atmosphere at least in the vicinity of the point of impact of the coolant. In cases in which the structural form of the surface to be cooled so permits, the entire space exterior to the intermediate layer 3, said space being designated by the numeral 9 in Figure 1, may be filled with a liquid, vaporous or gaseous protective substance of a suitable kind and the stream of coolant be conducted through this protective substance on to the intermediate layer to be cooled.

The composition of the stream of coolant 4 from various component materials including at least one having good thermal conductivity constitutes the most common case for the performance of the cooling process according to the present invention. Under certain circumstances it will be found advantageous to use a stream of coolant 4 consisting of uniform material in the liquid or gaseous state having good thermal conductivity and of a nature akin to that of the material of the intermediate layer 3. A typical application of the invention process in this variant can be performed by using mercury as the coolant 4. In this case the mercury is supplied as the stream of coolant, with no admixture of other component materials, to the body surface 1 to be cooled, and as the intermediate 3 a layer of amalgam is used which forms an alloy at the limiting surface 2 with the material of the body surface 1 to be cooled if the material of the said body surface 1 to be cooled is of a nature akin to that of mercury. In this event the use of a protective substance for the space exterior to the intermediate layer 3 can be dispensed with if the structural form of the body surface 1 is such as to enable said surface 1 to be located throughout its extent in a bath of mercury through which the stream of mercury is directed on to the intermediate layer 3. In this embodiment, however, it is also possible for the coolant to consist of a stream of gas having a high content of mercury vapour, which stream is projected against the wall 1 to be cooled or against the intermediate layer of amalgam 3. The gaseous component of the stream of coolant is so selected that it creates a protective gaseous atmosphere in the vicinity of the exterior face of the intermediate layer 3.

It is of importance to the performance of the process in the manner of Figure 1 that the stream of coolant 4 should impinge in a particular manner on the intermediate layer 3 to be cooled. As schematically indicated in Figure 1, it is essential that at least the particles 8 of the component material of good thermal conductivity should, in as high a proportion as possible, actually impinge on the exterior of the intermediate layer 3, to which end the stream of coolant must have a suitable cross-sectional form and an appropriate angle of impingement against the intermediate layer 3. Another requirement of influence on good eduction of heat by the stream of coolant is that the velocity and structure of the stream of coolant should be such as, when the particles 8 of the component material of good thermal conductivity have been in contact with the intermediate layer 3 and have absorbed their quota of thermal energy, to remove the said particles as speedily as possible from the vicinity of the surface to be cooled of the intermediate layers in order to ensure that they shall not, by persisting too long, interfere with the access of further particles 8 to the said surface to be cooled.

The quantity of heat conducted away mainly by the component material of good thermal conductivity of the coolant can be extracted from the stream of coolant by a cooling system of known construction, preferably by the addition of a secondary coolant, or by any other suitable method. In this case the possibility exists of constantly recirculating and reusing the primary coolant. According to the composition of the coolant from various component materials in the solid, liquid and gaseous state, the provision of means for the separate recovery of the individual components in their unmixed condition is necessary.

A preferred embodiment of the cooling process according to the present invention uses a coolant having at least one component material of good thermal conductivity whose particles are of a molecular weight approximately equal to the molecular weight of the intermediate layer and of the material of the body surface to be cooled. In this case the transfer of heat energy from the intermediate layer to the individual particles of the component material of good thermal conductivity of the coolant is particularly favourable, and the cooling action therefore particularly intense.

Very advantageous in the various typical embodiments of the present cooling process is such a choice of intermediate layer and of material component of good thermal conductivity of the coolant that the intermediate layer is produced or at least continuously regenerated during operation by the component material of good thermal conductivity.

These two last-named features of the cooling process are realized in the embodiment, already discussed, with mercury as the coolant if and when the body surface to be cooled consists of a metal which forms an amalgam with mercury. With this combination both approximate equality of the molecular weights and constant re-formation of the intermediate layer of amalgam by the high-conductivity component material of the coolant are achieved.

Figure 2:
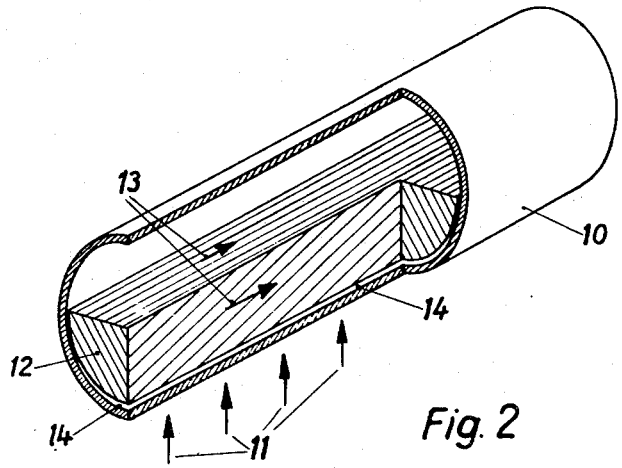
Figure 2 illustrates a further typical embodiment of the cooling process in the case of tubular structures.
Figure 3:
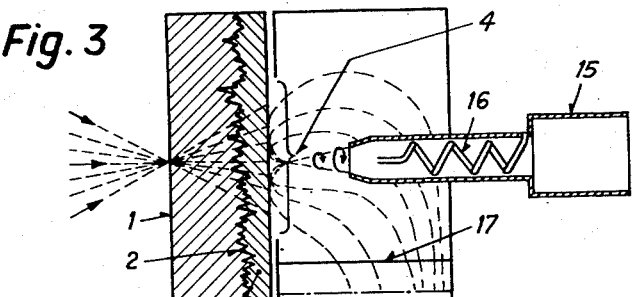
Figure 3 is a schematic representation of the cooling principle and of a typical device for the performance of the process in accordance with the invention.

A further typical embodiment of the cooling process according to the present invention is shown schematically in Figure 2. In this embodiment the body surface to be cooled is the inside of a tube 10, from which a thermal current flowing, for example, from below in the direction of the arrows 11 is to be conducted away, to which end the interior space of the tube 10 is filled at least partially with a coolant 12 which flows in the direction of the arrows 13. The internal surface of the tube 10 to be cooled is provided with an intermediate layer 14 consisting of a material of a nature akin both to the material of the inside wall of the tube and to the nature of at least one component material, of good thermal conductivity, of the coolant. In this embodiment also, the coolant may consist either of a uniform liquid material of good thermal conductivity, or of a liquid containing at least two component materials, in which latter case at least one of the component materials is a substance of solid, liquid or gaseous consistency having good thermal conductivity. It is also possible for the coolant flowing through the tube to be a stream of vaporous material of good thermal conductivity or a vapour having at least two component materials, in which latter case at least one of the component materials is a substance of solid, liquid or gaseous consistency having good thermal conductivity.

In this embodiment, to Figure 2, the intermediate layer 14 is produced and used in the same manner as already described in reference to Figure 1. In addition, however, the intermediate layer need not, if the coolant is a homogeneous liquid or a liquid consisting of a plurality of component materials, directly abut the stream of coolant 12, but may, at its inner face, be in contact with a film which constitutes a continuous transition to the coolant stream 12 and consists of a mixture of vaporous and liquid particles of the component materials thereof. Needless to say, the coolant may also contain finely divided component materials in the solid state which retain this state or are transformed into a mist of liquid particles in the transitional film from the intermediate layer to the stream of coolant.

The embodiment of the process schematically illustrated by way of example in Figure 2 is used not only in the case of tubular structures with internal cooling, but is also often employed with solid bodies, preferably of metal, if the said solid bodies have pores in which the coolant can circulate.

A typical embodiment of a device for the performance of the process according to the present invention will now be described; it consists of an electron discharge tube, more particularly an X-ray tube. It is a known fact that the need exists, in relation to a whole range of applications of the X-ray tube, to raise the radiation of energy above the level so far achieved. To this end, however, the load capacity of the Roentgen-tube anode per square millimetre of focal point area must be greatly increased. This load capacity is limited by the fact that the heat generated and accumulating in the focal point causes the temperature of the anode to rise constantly. The melting point of the material of which the anode is made sets a limit to the load capacity of the tube, and therefore to the radiant output. The problem is therefore essentially one of cooling. If the heat occurring can be conducted away in sufficient quantity and at sufficient speed, the load capacity will be increased.

In the electron discharge tubes at present known, a plate of tungsten at least 1 mm. thick is provided as the anode or target. In order to achieve adequate vacuum-tightness, a layer of copper at least 1 cm. thick is fused on to this anodic layer. In the presence of the great heat instantaneously arising in the focal point the heat accumulates in the low-conductivity tungsten anode, and the accumulation or congestion is aggravated by molecular fissures in the brittle tungsten sinter metal. At the point of transition from the tungsten to the copper a further accumulation of heat occurs, and only after overcoming this second obstacle can the heat pass through the thick layer of copper to the cooling surface and be conducted away. The conduction of the heat from the focal spot to the cooling surface requires a material space of time which is further increased, and materially so, by the accumulations of heat, so that with brief heavy loads eduction of the heat by means of the coolant is practically impossible. To this must be added, however, several further fundamental characteristics of the known X-ray tube which impair cooling. First of all, the solid layer has a rough and uneven surface, no matter how well it has been mechanically worked or chemically treated, and the drawbacks of such a surface have already been expounded. Then again, a layer of oxide, an unavoidable water film, or layers of impurities which, as is known, cannot be removed even by prolonged heating, in turn form a separatory layer which is an obstacle to the transfer of heat.

In a typical embodiment an X-ray tube which does not possess these drawbacks is described with reference to Figures 3 to 7. In the schematic representation of the cooling principle, in Figure 3, the numeral 1a designates the focal spot which arises on the thin layer of gold 1. On the face 2, which is never completely smooth and flat, of this layer of gold there is formed, by the supply of mercury to said face, a thin, coherent layer of amalgam 3 from the molecularly diffused coolant with a fine superficial stratum of mercury. The layers or strata 1 and 3 form a unit. The plate or layer 1 can therefore surrender its heat to the coolant of like molecular weight molecularly combined with it without any separatory layer being formed. The stream of coolant 4, which again forms with the surface a unit having no separatory layer, is preferably supplied by a pipe 15 in which a coil 16 is inserted so that the stream of coolant is set in rotation. This stream of coolant 4 impinges on the layer or stratum 3 and immediately conducts the heat, by convection, away from the cooling zone. The stream of coolant 4, which is conducted away after its first impact with the cooled surface, is now, immediately on leaving the cooling zone, conducted to a stationary or flowing coolant 17 of some other kind, such as water, to which it surrenders its stored heat. As a result, the stream of coolant proper, i. e. the mercury, can be used again.

Figure 4:
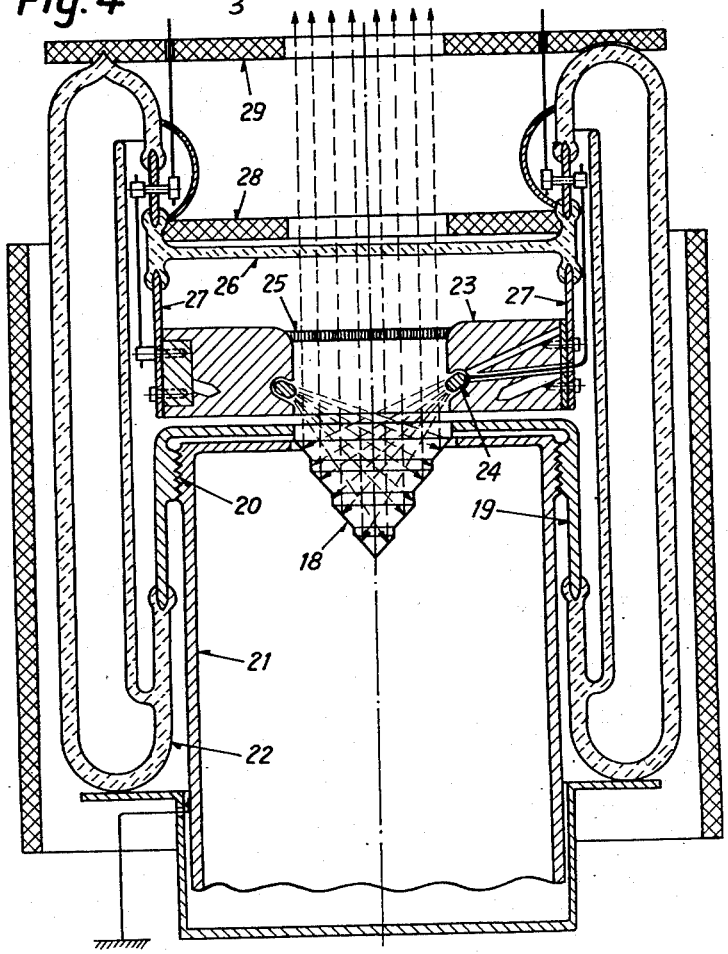
Figure 4 shows schematically the construction of an X-ray tube in combination with a cooling device according to the invention.

Figure 4 shows the schematic construction of an X-ray tube. The anode 18 is fused into a ring 19 and has the form, which will be discussed in greater detail below, of a hollow cone. The ring is provided with a screw thread 20 by means of which it is screwed on to the cooling device 21 not here shown in detail. The anode ring 19 is fused into a glass member 22. The cathode 23 has a filament 24 of known construction and assembly. The cathode is sealed off by a filter 25.

Above the cathode the tube window 26 is mounted on suitable supports 27, with a screen 28 arranged before it. Resting on the glass member or cylinder 22 is the protective screen 29, which may, if desired, also contain a filter. The supply of electric current is arranged in a known manner.

Figure 5 shows in greater detail the construction of the anode and its cooling arrangement. The anode 18 is mounted, as mentioned, in a copper ring 19 and takes the form of a holow cone with a number of shoulders 30, 31. The emitted electrons emerging from the filament 24 impinge upon the anode, which in this embodiment is made of gold. The cooling device consists of a hollow cylinder 32 and is provided with a series of intercommunicating annular chambers 33, 34, 35, 36, 37, 38 and 39 arranged one above the other. Mercury is supplied to these annular chambers through the pipe 40. The mercury emerges from each chamber via the coil 16, already mentioned, provided in the feed pipe, on to the rear face of the anode. There the coolant impinges, in the direction of the arrows 41, on the rear face of the anode and extracts heat from the anode. A further coolant, for example water, is supplied via the pipe 42 and the annular cavity 43 and similarly passes through suitable openings 44 into the cavities surrounding the anode, which cavities may if desired be subdivided by partitions 45. This stream of coolant, however, is supplied to the anode below the stream of mercury, so that only the mercury comes into direct contact with the anode. In other words, as the mercury stream rebounds from the surface of the anode 18, it is directed downwardly and thus encounters the water flowing toward the anode through the openings 44. Due to such encounter, the water is deflected downwardly without ever having come in contact with the anode 18. The mercury flowing away mixes with the water and surrenders its heat to the latter. The water and mercury together pass into the chamber 46, which is designed as a collecting vessel. Here the mercury collecting in the bottom of the chamber 46 is conducted away through a U-tube 47, whilst the water is drained off by the pipe 48.

Figure 7 shows by way of example how the coolant circulation can be handled by a duplex pump of known construction. The cooling water is fed through a pipe 51 into a tank 49 containing a filter 50. The supply of cooling water is regulated in the known manner by a float 52 controlling the water supply shut-off means 53. The excess water is conducted away by the overflow pipe 54. From the tank 41 the water passes via the pipe 55 to the duplex pump casing 56, where by means of the rotary drum 57 it is pumped through the pipe 58 into the anode system. In the second pump the circulation of the mercury is taken care of by the drum 60 mounted on the same shaft 59 as the drum 57. The mercury likewise passes, through pipe 61, into the cooling system, is separated from the water in the separator 62 and, in the cooled condition, returned to the pump through the pipe 63. The water, now conducting all the heat away, is drained off through the pipe 64 or, if preferred, reused after cooling.

Needless to say, the construction of X-ray tube schematically shown constitutes only one of numerous possible constructions. For example, it would also be possible for the anode to be made of some other material or of several layers of different materials, and to have any other preferred shape, and the method of supply of the two coolants, or possibly of only one coolant adapted to the material of the anode, and the construction of the cooling unit itself, could be carried out in any other suitable manner. The coolant or coolants could be supplied by gas pressure. What is essential to the invention is the direct education, without accumulation, of the heat produced by the electron bombardment.

The cooling process in accordance with the present invention is not by any means limited to the described typical embodiments, but comprises all embodiments in which an intermediate layer provides the thermal contact between the body surface to be cooled and the coolant, where at least one component material of the coolant possesses good thermal conductivity, predominantly accomplishes the education of the heat, and is of a nature akin to that of the intermediate layer.

In the present specification the term "particle" is variously employed in connection with finely-divided material. This generic term is intended, since no uniform designation exists in relation to disperse systems, to comprise both molecules in the chemical and physical sense, and colloidal substances, suspensions, sedimentations, molecular groups, finely-divided material in the solid, liquid or gaseous state and in any desired environment, aerosols, mists, pulverizations, vapours, sublimations, and all and any other individual microsystems.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. The process of cooling a metallic surface having an affinity for mercury, comprising the steps of spraying mercury obliquely onto first spaced areas of said surface to cause said mercury to rebound obliquely from said first areas of said surface, directing water toward second spaced areas of said surface located adjacent the paths of movement of said rebounding mercury, whereby said rebounding mercury deflects said water from its original path of movement and substantially screens said second areas from said water, thus effectively preventing said water from contacting said surface, collecting both said mercury and said water together, whereby heat removed from said surface by said mercury is in turn removed from the latter by said water, separating said mercury and said water from each other, and recirculating the same independently of one another for further cooling of said surface.

2. In a heat transfer system for a discharge tube and like instrument having a target with a surface layer of amalgamated material; a first reservoir for mercury, a second reservoir for delivering water, means for conducting said water from said second reservoir toward predetermined areas of said target layer, means for conducting said mercury from said first reservoir toward said layer and impinging said mercury against said layer at locations above said predetermined areas, whereby said mercury after impingement upon said layer of amalgamated material is caused to drop and intercept said water to prevent said water from contacting said layer, whereby water joins said dropping mercury for heat exchange with the latter, and means for collecting said dropped water and mercury and provided with upper and lower spaced discharge openings, whereby said water and said mercury stratify in said collecting means, thereby facilitating separation of said mercury through said lower discharge opening and of said water through said upper discharge opening.

3. In a system according to claim 2, said mercury conducting and impinging means and said water conducting means comprising duplex pump means.

4. In a system according to claim 2, including conduit means extending from said lower discharge opening to said mercury impinging means for recirculation of said separated mercury.

5. In a system according to claim 2, wherein said target is substantially conical in contour, said amalgamated material being provided on the outer surface thereof.

6. In a system according to claim 2, wherein said target is composed of said amalgamated material.

7. In a system according to claim 2, said target being composed of gold.

8. In a heat transfer system for cooling the target of a discharge tube having a metallic surface layer; a first reservoir supplying mercury, a second reservoir delivering water, means forcibly conducting water toward a predetermined area of said surface, means impinging mercury supplied from said first reservoir against said surface layer at a location positioned above said predetermined area, whereby mercury after impingement upon said layer subsequently drops therefrom and prevents said water from contacting said surface area, so that said water joins said dropping mercury for heat exchange with the latter, means collecting said dropped water and mercury, means provided in said collecting means separating said mercury from said water, and means recirculating said separated mercury to said first reservoir.

References Cited in the file of this patent

UNITED STATES PATENTS

| | | |
|---|---|---|
| 1,501,862 | Midgley | July 15, 1924 |
| 1,792,784 | Trent | Feb. 17, 1931 |
| 1,795,348 | Schmidt | Mar. 10, 1931 |
| 2,156,493 | Durrell | May 2, 1939 |
| 2,209,304 | Alder | July 30, 1940 |
| 2,277,073 | Colbert | Mar. 24, 1942 |
| 2,443,210 | Upham | June 25, 1948 |
| 2,469,729 | Hunter | May 10, 1949 |
| 2,512,143 | Dailey | June 20, 1950 |

FOREIGN PATENTS

| | | |
|---|---|---|
| 344,320 | Great Britain | Mar. 5, 1931 |
| 398,492 | Great Britain | Oct. 11, 1933 |
| 587,774 | Great Britain | May 6, 1947 |
| 623,674 | Great Britain | May 20, 1949 |